US010055805B2

(12) United States Patent
Satou (10) Patent No.: US 10,055,805 B2
(45) Date of Patent: Aug. 21, 2018

(54) DEVICE FOR MEASURING POSITIONS AND POSTURES OF PLURALITY OF ARTICLES, AND ROBOT SYSTEM HAVING THE DEVICE (71) Applicant: FANUC CORPORATION, Yamanashi (JP)

(72) Inventor: Taiga Satou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/361,273

(22) Filed: Nov. 25, 2016

(65) Prior Publication Data
US 2017/0154397 A1 Jun. 1, 2017

(30) Foreign Application Priority Data
Nov. 30, 2015 (JP) ................. 2015-233181

(51) Int. Cl.
G06K 9/00 (2006.01)
G06T 1/00 (2006.01)
(Continued)

(52) U.S. Cl.
CPC .......... *G06T 1/0014* (2013.01); *B25J 9/1679* (2013.01); *B25J 9/1697* (2013.01); *B25J 13/08* (2013.01);
(Continued)

(58) Field of Classification Search
CPC .......... B25J 13/08; G05B 2219/40053; G06T 1/0014; G06T 2207/10004; G06T 7/60
(Continued)

(56) References Cited

U.S. PATENT DOCUMENTS

2009/0033655 A1 2/2009 Boca et al.
2013/0238124 A1* 9/2013 Suzuki .................. B25J 9/16
700/250
(Continued)

FOREIGN PATENT DOCUMENTS

CN 102472612 A 5/2012
CN 103307975 A 9/2013
(Continued)

OTHER PUBLICATIONS

Shuichi Akizuki et al., "Hi-Speed Object Recognition using Distinctive 3D Vector Pairs for Random Parts Picking", IPSJ SIG Technical Report, May 23, 2012, pp. 1-7, vol. 2012-CVIM-182 No. 15, Information Processing Society of Japan, Tokyo Japan, for which an explanation of relevance is attached.

Primary Examiner — Manuchehr Rahmjoo
(74) Attorney, Agent, or Firm — Hauptman Ham, LLP (57) ABSTRACT A position/posture measurement device, capable of precisely measuring the position/posture of each article, and a robot system including the device and a robot, in which the robot can be correctly operated with respect to the articles. The position/posture measurement device has: a model data storing part which stores three-dimensional shape data representing the shape of a workpiece as model data; a position/posture calculating part which detects each workpiece and calculates the positions/postures of the workpieces by comparing the model data stored by the model data storing part to the scene data transmitted from a three-dimensional sensor; and a combination evaluating part which calculates evaluation values with respect to all combinations of the positions/postures calculated by the position/posture calculating part, and transmits the combination of the positions/postures having the maximum evaluation value as a measurement result to a robot controller.

11 Claims, 4 Drawing Sheets (51) Int. Cl.
*B25J 13/08* (2006.01)
*G06T 7/60* (2017.01)
*B25J 9/16* (2006.01)

(52) U.S. Cl.
CPC ...... *G06T 7/60* (2013.01); *G05B 2219/40053* (2013.01); *G05B 2219/40607* (2013.01); *G06T 2207/10004* (2013.01)

(58) Field of Classification Search
USPC ......................................................... 382/153
See application file for complete search history.

(56) References Cited

U.S. PATENT DOCUMENTS

| | | | |
|---|---|---|---|
| 2013/0245828 A1 | 9/2013 | Tateno et al. | |
| 2014/0233807 A1 | 8/2014 | Ejima et al. | |
| 2015/0003678 A1* | 1/2015 | Watanabe | B25J 9/1697 382/103 |
| 2015/0262012 A1 | 9/2015 | Kim et al. | |

FOREIGN PATENT DOCUMENTS

| | | |
|---|---|---|
| CN | 104006740 A | 8/2014 |
| JP | 2009-129189 A | 6/2009 |
| JP | 2009128191 A | 6/2009 |
| JP | 2010210511 A | 9/2010 |
| JP | 2012-163450 A | 8/2012 |
| JP | 2014-160370 | 9/2014 |

* cited by examiner

DEVICE FOR MEASURING POSITIONS AND POSTURES OF PLURALITY OF ARTICLES, AND ROBOT SYSTEM HAVING THE DEVICE

RELATED APPLICATIONS

The present application claims priority to Japanese Patent Application Number 2015-233181, filed Nov. 30, 2015, the disclosure of which is hereby incorporated by reference herein in its entirety.

BACKGROUND OF THE INVENTION

1. Field of the Invention

The present invention relates to a position/posture measurement device for measuring positions and postures of a plurality of articles, and a robot system including the position/posture measurement device and a robot for carrying out an operation with respect to the articles.

2. Description of the Related Art

In a robot system for carrying out an operation such as taking out by using a robot with respect to a plurality of articles positioned within a predetermined region such as a container or pallet, the position and posture (hereinafter, also referred to as "position/posture") of the article are measured before the operation. In the prior art, various methods or devices have been proposed for measuring the position/posture of the articles to be operated.

For example, JP 2010-210511 A discloses a three-dimensional position/posture recognition device, in which an object is recognized by comparing three-dimensional position/posture data of a group of the objects and three-dimensional position/posture model data of the object after changing the position/posture of the object, and by determining the object having a high degree of coincidence with the position/posture of the three-dimensional model thereof.

JP 2009-128191 A discloses an article recognition device, in which an object is positioned with high speed based on a feature of the object such as a spin image, a three-dimensional feature data (model) of the object are compared to a distance data (scene) obtained by a range sensor, and the three-dimensional position/posture of the object are rapidly recognized. This document describes that, by using position/posture information output from the article recognition device, a robot can be rapidly operated based on the actual position/posture of the object.

For example, in case that a plurality of articles having the same shape is randomly located while contacting or overlapping with each other, when the position/posture of each article should be measured by comparing the three-dimensional model and the measurement data, the same feature of the article may be repeatedly observed within a measurement region, whereby a measurement error may be generated (refer to FIG. 5 and an explanation thereof as described below). Such a measurement error may be generated due to a positional relationship between the articles, and is difficult to be solved by the technique for improving measurement accuracy of each article, as described in JP 2010-210511 A or JP 2009-128191 A. As a result, it is difficult to properly take out the article by using the robot based on the measurement result.

SUMMARY OF THE INVENTION

An object of the present invention is to provide a position/posture measurement device, capable of precisely measuring the position/posture of each article even when a plurality of the same type of articles are randomly located, and also provide a robot system including the device and a robot, in which the robot can be correctly operated with respect to the articles.

According to one aspect of the present invention, a position/posture measurement device for measuring positions/postures of a plurality of articles positioned within a measurement region, comprising: a model data storing part which stores feature information of the article as model data; a sensor part which measures inside of the measurement region so as to obtain scene data including the articles; a position/posture calculating part which calculates the positions/postures of the articles by comparing the model data to the scene data; and a combination evaluating part which selects a plurality of combinations of the positions/postures including a single position/posture which are calculated by the position/posture calculating part, calculates evaluation values with respect to the respective selected combinations of the positions/postures, and outputs the combination of the positions/postures having the maximum evaluation value as the positions/postures of the articles, is provided.

In a preferred embodiment, the combination evaluating part locates the model data on each position/posture of the articles, calculates a degree of coincidence between the located model data and the scene data and a degree of overlapping, and calculates the evaluation value based on the degree of coincidence and the degree of overlapping, the degree of overlapping being obtained by calculating an overlapping region between the located model data when the model data is located on all positions/postures included in the combinations of the positions/postures.

In a preferred embodiment, the model data storing part stores three-dimensional model data of the article as the feature information, and the combination evaluating part calculates the degree of overlapping as an overlapping volume between the located model data when the model data is located on all positions/postures included in the combinations of the positions/postures.

In a preferred embodiment, the model data storing part stores three-dimensional model data of the article as the feature information, the sensor part obtains three-dimensional features of surfaces of the articles within the measurement region as the scene data, and the combination evaluating part calculates the degree of coincidence as an area of a region where the surface of the three-dimensional model data coincides with the scene data, or as a number of three-dimensional points where the surface of the three-dimensional model data corresponds to the scene data, when the model data is located on each position/posture of the articles.

In a preferred embodiment, the sensor part obtains an image of the articles within the measurement region as the scene data, and the combination evaluating part calculates the degree of overlapping as an overlapping area between the located model data on the image when the model data is located on all positions/postures included in the combinations of the positions/postures.

In a preferred embodiment, the model data storing part stores a group of feature points extracted from the feature information of the article, and the combination evaluating part extracts a feature point from the scene data, and calculates the degree of coincidence as a number of the feature points included in the model data when the model data is located on the position/posture which coincide with the feature points extracted from the scene data.

According to another aspect of the present invention, a robot system comprising: the above position/posture measurement device; a robot configured to carry out an operation with respect to the plurality of articles; and a robot controller configured to control the robot, is provided.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
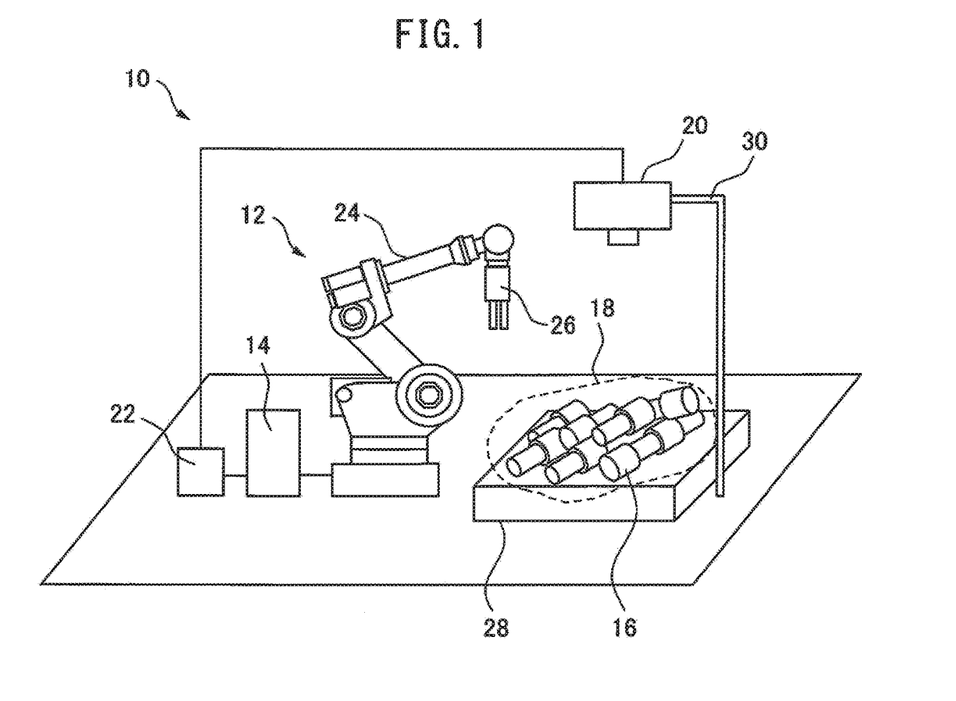
FIG. 1 is a view of a schematic configuration of a robot system according to a first embodiment of the present invention.

FIG. 1 is a view showing a schematic configuration of a robot system 10 according to a first embodiment of the present invention. Robot system 10 includes: a robot 12; a robot controller 14 connected to robot 12 and configured to control robot 12; a sensor part (or a three-dimensional sensor) 20 configured to capture a measurement region 18 where a plurality of articles (workpieces) 16 to be operated by robot 12 are located, and obtain a three-dimensional feature of a surface of workpiece 16 as scene data; and a workpiece position/posture measuring part (or a position/posture measurement device) 22 connected to three-dimensional sensor 20 and configured to measure the position and posture (or the position/posture) of the workpiece based on the scene data obtained by three-dimensional sensor 20.

For example, robot 12 is a multi-joint robot having six axes, and has a movable part such as a robot arm 24, and a robot hand (or a gripper) 26 attached to a front end of robot arm 24. Workpieces 16 are located on predetermined operation region 18 (in the illustrated embodiment, on a pallet 28), and robot 12 is configured to grip and take out workpieces 16 sequentially (normally, one-by-one) by using gripper 26. Robot controller 14 controls (the motions of robot arm 24 and gripper 26 of) robot 12 so as to carry out a take-out operation with respect to the workpieces, based on the positions/postures of workpieces 16 measured and output by position/posture measuring part 22.

Three-dimensional sensor 20 is configured to transmit scene data of surface shapes of workpieces 16 located within the measurement region to position/posture measurement device 22. Various types of non-contact sensors may be used as three-dimensional sensor 20, for example, a stereo-type sensor that uses two cameras, a scanning-type sensor that uses a laser slit beam or a laser spot beam, a projecting-type sensor that projects pattern light on the article by using a projector, etc., or another type of sensor that utilizes time from when light is irradiated from a projector to when the light enters an optical receiver after being reflected by the surface of the article, etc., may be used. In addition, although three-dimensional sensor 20 is fixed to a dedicated pedestal or frame 30 in FIG. 1, sensor 20 may be attached to the movable part such as robot arm 24.

Figure 2:
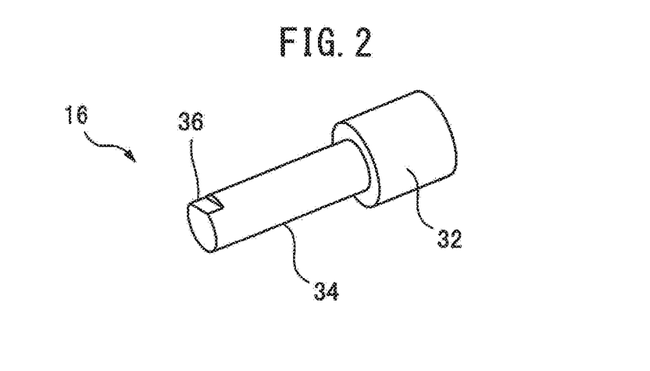
FIG. 2 is a view of an example of a shape of a single workpiece.

FIG. 2 is a view of an example of the shape of single workpiece 16. Workpiece 16 has a large diameter portion 32 with a cylindrical shape, and a small diameter portion 34 having a diameter smaller than large diameter portion 32 and coaxially connected to large diameter portion 32. Further, a notch 36 is formed at an axial end of small diameter portion 34. In the embodiment, plurality of workpieces 16 has the same shape and the same dimension, whereas the present invention is not limited as such.

Figure 3:
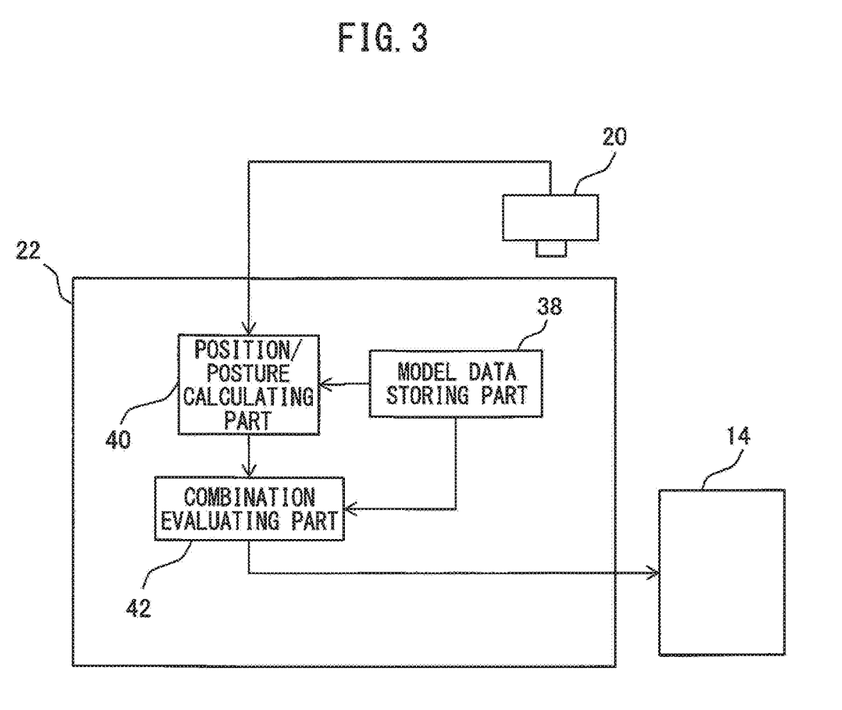
FIG. 3 is a block diagram of a position/posture measurement device of FIG. 1.

FIG. 3 is a block diagram of position/posture measurement device 22. Position/posture measurement device 22 has: a model data storing part 38 which stores three-dimensional shape data (or feature information) representing the shape of workpiece 16 as model data; a position/posture calculating part 40 which detects each workpiece 16 and calculates the positions/postures of workpieces 16 by comparing the model data stored by model data storing part 38 to the scene data transmitted from three-dimensional sensor 20; and a combination evaluating part 42 which calculates evaluation values with respect to all combinations of the positions/postures calculated by position/posture calculating part 40, and transmits the combination of the positions/postures having the maximum evaluation value as a measurement result to robot controller 14. In this regard, the model data may be CAD data of workpiece 16 or may be generated from the CAD data. Alternatively, the model data may be obtained by measuring the shape of workpiece 16 by three-dimensional sensor 20.

Next, a procedure in robot system 10 will be explained with reference to a flowchart of FIG. 4. First, in step S101, as shown in FIG. 1, three-dimensional sensor 20 captures or measures plurality of workpieces 16 (in this case, having the same shape and the same dimension) located in measurement region 18 (for example, on pallet 28), so as to obtain scene data including the surface shapes of workpieces 16 within measurement region 18. The obtained scene data is transmitted to (position/posture calculating part 40 of) position/posture measurement device 22.

Next, in step S102, position/posture calculating part 40 compares the transmitted scene data to the model data stored in model data storing part 38, and calculates the positions/postures of workpieces 16.

With regard to step S102, various methods can be used to compare the model data to the scene data and calculate the three-dimensional position/posture of the workpiece, and there is no particular limitation regarding the methods. For example, a three-dimensional feature such as a PPF (point pair feature) or a SHOT (signature of histogram of orientation) is calculated from a plurality of three-dimensional positions on the surface of the model data. On the other hand, the three-dimensional feature is also calculated from the measurement data. Then, a three-dimensional position having the same feature is searched from the scene data, whereby the position/posture can be calculated. In another method, the position/posture of the model data is changed within a predetermined search range, a region where the surface of the model data coincides with the scene data is calculated, and then the position/posture is output as a calculation result when an area of the region is equal to or more than a predetermined value.

In the next step S103, combination evaluating part 42 virtually locates the three-dimensional model data stored in model data storing part 38 on each of the positions/postures of the workpieces calculated by position/posture calculating part 40, compares the surface of the model data to the scene data, and calculates a degree of coincidence as an area of a region where the model data coincides with the scene data. When the scene data is obtained as a group of three-dimensional points, etc., the degree of coincidence is calculated as a number of the three-dimensional points where the surface of the model data corresponds to the scene data (or where the surface of the model data coincides with the scene data within a predetermined error range). Further, combination evaluating part 42 virtually locates the model data stored in model data storing part 38 on all pairs positions/postures calculated by position/posture calculating part 40, and calculates a degree of overlapping as a volume of an overlapping region between the (two) model data (step S104).

In the next step S105, from all of the positions/postures calculated by position/posture calculating part 40, combination evaluating part 42 selects a combination of position/posture, an evaluation value of which has not been calculated. Next, in step S106, with respect to the selected combination of position/posture, an evaluation value of the combination is calculated, by using the degree of coincidence calculated in step S103 and the degree of overlapping calculated in step S104 which are included in the selected combination. Then, when the evaluation value of the combination currently selected is larger than the maximum evaluation value among the evaluation values of the combinations which have been calculated, the currently selected combination is stored or held as a candidate of the measurement result, in combination evaluating part 42 or a proper memory, etc.

In step S106, with respect to all of the combinations of positions/postures calculated by position/posture calculating part 40, combination evaluating part 42 calculates the respective evaluation values based on the degree of coincidence and the degree of overlapping, included in the respective combinations of the positions/postures. Concretely, the evaluation value of the combination of position/posture is calculated based on the degree of coincidence of the position/posture of the selected workpiece, and the degree of overlapping of all pairs included in the combinations of the selected workpieces. An example of calculating formula for the evaluation value is represented by following equation (1).

$$S_a = k_1 \sum_{x_i \in C_a} f(x_i) - k_2 \sum_{x_i \in C_a, x_j \in C_a, i \neq j} g(x_i, x_j) \qquad (1)$$

For example, in equation (1), evaluation value $S_a$ of combination $C_a$ can be obtained by subtracting degree of overlapping $g(x_i, x_j)$ of two positions/postures $x_i$ and $x_j$ included in combination $C_a$, multiplied by weight $k_2$, from degree of coincidence $f(x_i)$ of position/posture $x_i$ included in combination $C_a$, multiplied by weight $k_1$.

An example of the above procedure will be explained with reference to FIG. 5, which illustrates that a plurality of workpieces is randomly located. In the example of FIG. 5, in fact, there are three workpieces 16a, 16b and 16c. In this regard, when large diameter portion 32b of workpiece 16b and small diameter portion 34c of workpiece 16c coaxially contact each other, one (unreal) workpiece 16d constituted by large diameter portion 32b and small diameter portion 34c may be detected by a conventional position/posture detecting method. In this case, four combinations of positions/postures of workpieces are detected in step S102, and the combinations include a combination of workpieces 16d and 16b, and a combination of workpieces 16d and 16c.

However, in such a case, a larger diameter portion or workpiece 16d is identical to large diameter portion 32b of workpiece 16b (i.e., the two large diameter portions overlap with each other), and thus an evaluation value of the combination including workpieces 16d and 16b calculated by using equation (1) is relatively low. Similarly, a small diameter portion or workpiece 16d is identical to small diameter portion 34c of workpiece 16c (i.e., the two small diameter portions overlap with each other), and thus an evaluation value of the combination including workpieces 16d and 16c calculated by using equation (1) is also relatively low.

Figure 5:
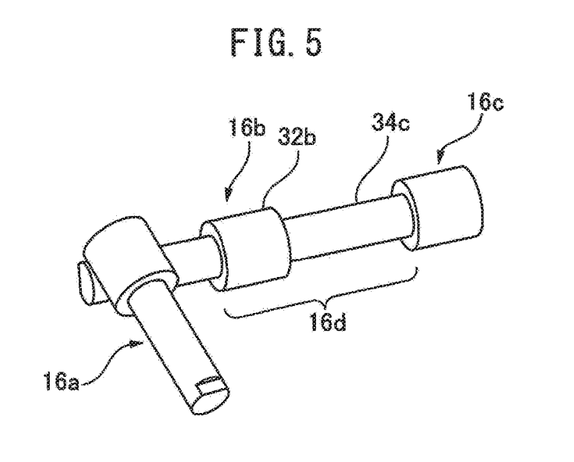
FIG. 5 shows an example of a state in which a plurality of workpieces is randomly located.

As a result, in the example of FIG. 5, when the evaluation values are respectively calculated with respect to all combinations of positions/postures of workpieces 16a to 16d, an evaluation value of a combination consisting of workpieces 16a, 16b and 16c (not including 16d) is maximum, and therefore, this combination (consisting of three workpieces 16a, 16b and 16c) is transmitted from position/posture measurement part 22 to robot controller 14, as the correct positions/postures of the workpieces (in this case, three workpieces). Accordingly, robot 12 can take out the workpieces based on the optimum measurement result.

In addition, a calculation formula for calculating the evaluation value is not limited to equation (1). For example, the model data stored in model data storing part 38 may be virtually located on the calculated position/posture, the located model data may be compared to the scene data so as to calculate a region of the model data which does not physically coincide with the scene data, and the calculated region may be incorporated in the evaluation value of the combination.

In the first embodiment, combination evaluating part 42 calculates the evaluation values with respect to all combinations of the positions/postures calculated by position/posture calculating part 40, and outputs the measurement result. In this regard, the evaluation values may be calculated with respect to previously selected combinations only. For example, the evaluation value may be calculated with respect to only the combination including a specific workpiece, or may be calculated with respect to only the combination excluding a specific workpiece. Further, equation (1) may be modified to a quadratic integer programming problem, whereby an approximate solution can be effectively obtained.

Figure 4:
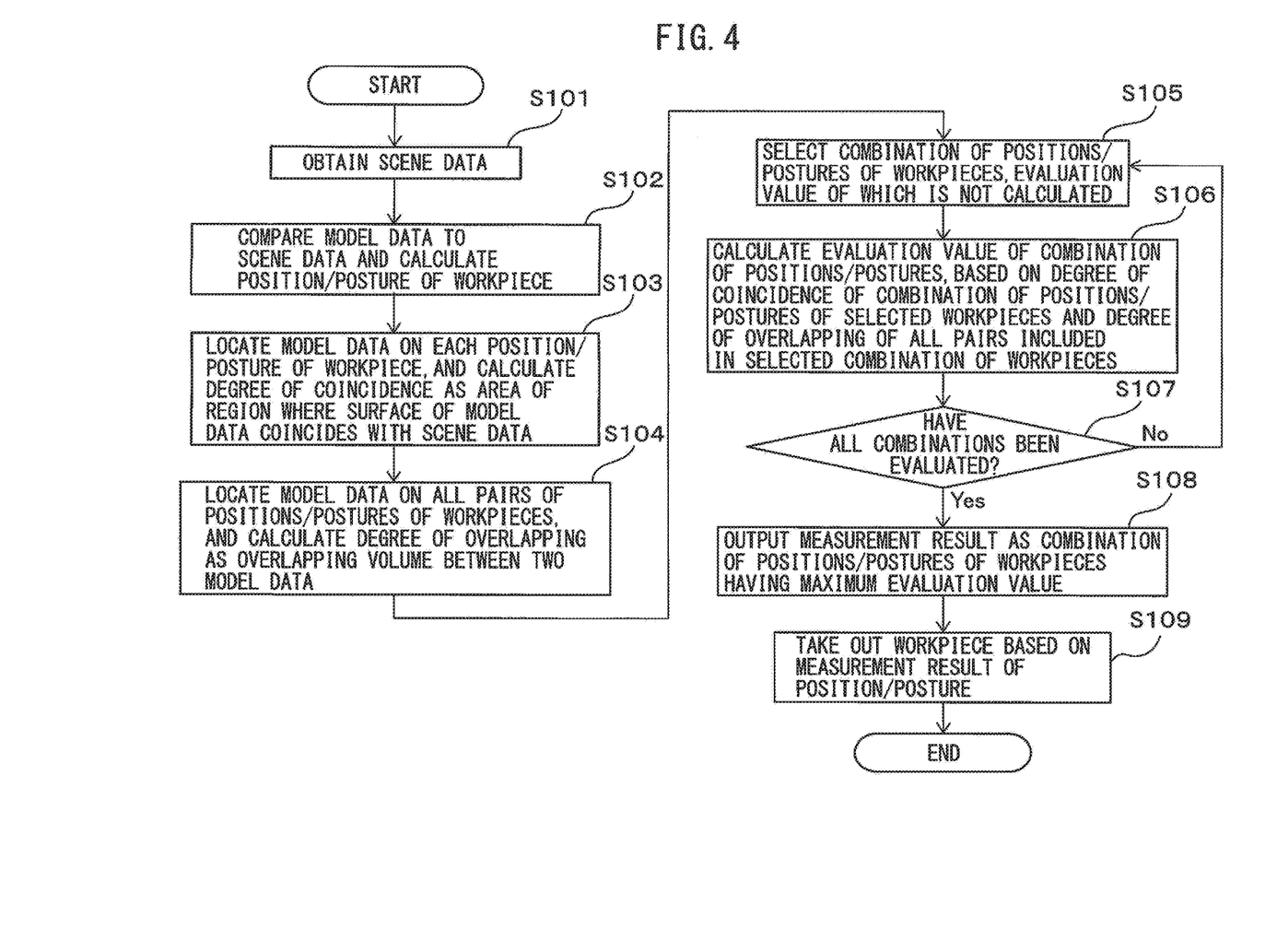
FIG. 4 is a flowchart showing an example of a procedure in the robot system of FIG. 1.

With reference to FIG. 4, in step S107, it is judged as to whether or not the evaluation values of all combinations have been calculated. If the evaluation values of all combinations have been calculated, the procedure progresses to step S108, otherwise, the procedure is returned to step S105.

In step S108, the candidate of the measurement result (i.e., having the maximum evaluation value) held by position/posture measurement device 22 is output or transmitted as the optimum measurement result to robot controller 14. In the next step S109, based on the position/posture corresponding to the transmitted measurement result, robot controller 14 controls robot 12 so as to hold and take out the target workpiece by using gripper 26.

In the first embodiment, the evaluation value calculated for each combination includes the degree of coincidence and the degree of overlapping, and the evaluation value increases with an increase in the degree of coincidence, and decreases with an increase in the degree of overlapping. Therefore, when the degree of overlapping is high, the evaluation value becomes relatively low even when the degree of coincidence is high, and thus such an evaluation value may not be transmitted as the optimum position/posture to robot controller 14. As such, in position/posture measurement device 22, by calculating the evaluation value of not only the position/posture of the single workpiece but also the combination of the positions/postures including the single position/posture, the detection error as exemplified in FIG. 5 can be avoided. Therefore, in robot system 10 in which robot controller 14 controls robot 12 based on the position/posture output from position/posture measurement device 22, robot 12 can carry out the handling operation for workpieces 16 based on the correct position/posture information.

Further, in the first embodiment, by calculating the degree of coincidence as the area of the region where the model data coincides with the scene data which corresponds to the shape data of the surfaces of workpieces 16 within the measurement region, the combination of the candidates of positions/postures, by which the region where the model data coincides with the scene data is increased or maximized, is obtained as the measurement result. By virtue of this, a probability that one or some of the workpieces within the measurement region cannot be taken out by the robot can be reduced. Further, by calculating the degree of overlapping as the overlapping volume between the model data located on the candidates of positions/postures by using the three-dimensional data, the combination of the candidates which cannot physically coexist can be determined, whereby an inappropriate combination of the candidates of positions/postures can be correctly excluded. Therefore, a probability that the robot can correctly carry out the operation can be increased.

Figure 6:
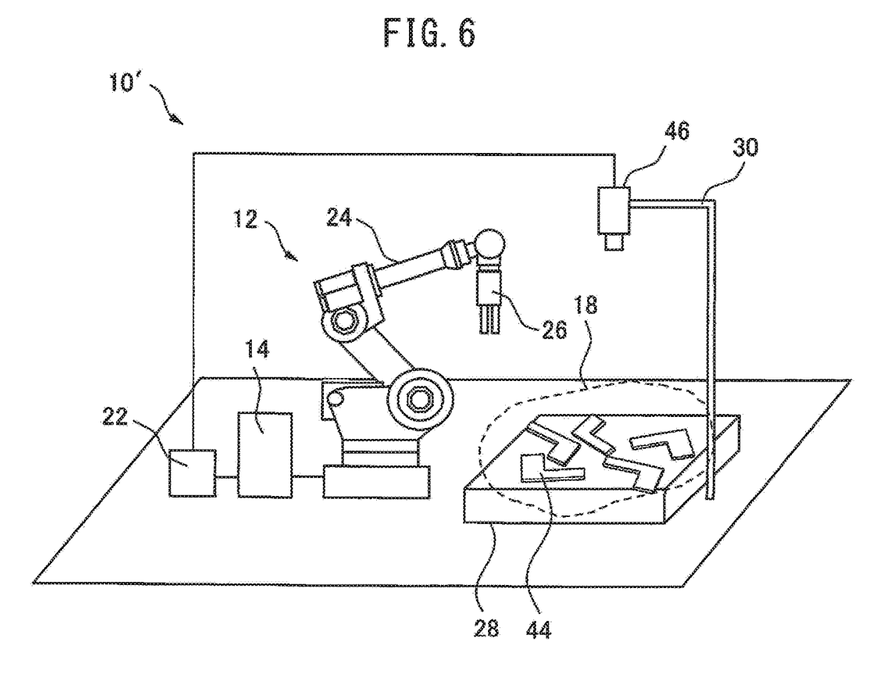
FIG. 6 is a view of a schematic configuration of a robot system according to a second embodiment of the present invention.

FIG. 6 is a view showing a schematic configuration of a robot system 10' according to a second embodiment of the present invention. In the second embodiment, only a component different from the first embodiment will be explained, and therefore, the same reference numerals are added to the components of the second embodiment corresponding to the components of the first embodiment, and detailed explanations thereof will be omitted.

In the second embodiment, a workpiece 44 to be taken out has a planar shape such as a metal plate, and a plurality of workpieces 44 is located on a plane within the operation region (or the measurement region) of robot 12. Two-dimensional sensor (for example, one camera) 46 obtains a scene data as a two-dimensional image of the workpieces. Camera 46 can obtain the scene data as an image of workpieces 44 within measurement region 18.

Model data storing part 38 included in position/posture measurement device 22 stores or holds the model data as the two-dimensional image obtained by capturing workpiece 44 by camera 46 and a region of workpiece 44 on the two-dimensional image. Further, model data storing part 38 stores a group of feature points of workpiece 44 extracted from feature information of the workpiece.

Position/posture calculating part 40 of position/posture measurement device 22 compares the model data of the workpiece to the scene data, so as to specify the position/posture of each workpiece on the two-dimensional image. In this regard, various methods can be used to compare the model data to the scene data and calculate the position/posture of the objective article on the two-dimensional image, and there is no particular limitation regarding the methods. For example, an image feature such as a SIFT (scale invariant feature transform) or a SURF (speeded up robust features) is calculated from the model data. On the other hand, the similar image feature is also calculated from the scene data. Then, by calculating four or more correspondence relationships between the image features, the position/posture can be calculated.

Further, position/posture calculating part 40 holds or stores information of the plane on which workpieces 44 are located (in this case, the upper surface of pallet 28), and can specify the three-dimensional position/posture of each workpiece 44 based on the information and the position of each workpiece on the two-dimensional image.

In order to calculate the degree of coincidence, combination evaluating part 42 of position/posture measurement device 22 extracts an edge feature (or a feature point) of the image from the model data and the scene data. Then, combination evaluating part 42 calculates the position/posture of the edge feature included in the model data stored in model data storing part 38 when the model data is virtually located on the position/posture calculated by position/posture calculating part 40, and compares the calculated edge feature to the edge feature extracted from the scene data so as to calculate the degree of coincidence of the respective positions/postures. Concretely, the number of the feature points extracted from the shape information of the three-dimensional model of workpiece 44, which coincide with the respective feature points extracted from the scene data, may be determined as the degree of coincidence.

Further, combination evaluating part 42 virtually locates the model data stored in model data storing part 38 on the position/posture calculated by position/posture calculating part 40, and calculates the degree of overlapping as an overlapping area, where the regions of the model data of the pair of positions/postures stored in model data storing part 38 overlap with each other on the image obtained by the two-dimensional sensor.

In the second embodiment, since each workpiece 44 has the substantially planar shape, even when a three-dimensional sensor is not used to obtain the scene data, a system having high measurement accuracy can be constituted, by using a relatively inexpensive two-dimensional sensor (such as a camera). Further, by calculating the degree of coincidence as the number of feature points extracted from the shape information of the workpiece which coincide with the respective feature points extracted from the scene data, and by calculating the degree of overlapping as the overlapping area between the model data on the two-dimensional image, the correct combination of the candidates of positions/postures can be obtained as the measurement result.

In addition, the methods for calculating the degree of coincidence and the degree of overlapping as explained with respect to the first and second embodiments may be properly combined. For example, the method for calculating the degree of coincidence in the first embodiment can be combined with the method for calculating the degree of overlapping in the second embodiment.

Although the position/posture measurement device in the above embodiments is explained as a separate device (such as a personal computer, etc.) connected to the robot controller, the position/posture measurement device may be incorporated into or integrated with the robot controller. Further, each function of the position/posture measurement device may be realized by a CPU and/or a memory, etc.

According to the position/posture measurement device of the present invention, the candidate of position/posture can be selected based on the evaluation values calculated not only with respect to the candidate of position/posture of each workpiece, but also with respect to the candidates of positions/postures of the plurality of workpieces. Therefore, the present invention can significantly reduce the probability of a measurement error, which is difficult to be resolved when only the candidate of position/posture of each workpiece is evaluated. Further, since the measurement error can be eliminated by a criterion different from the evaluation value of each candidate of position/posture, a threshold of the evaluation value of each candidate of position/posture can be set to a low value, whereby the probability that an actually existing article is not output as a measurement result can be reduced.

In addition, in the robot system including the position/posture measurement device, the probability that the robot can correctly carry out the operation can be increased. In particular, when the robot is required to carry out the operation with respect to all objective articles within the measurement region, the probability that one or some of the articles is not handled by the robot can be reduced.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A position/posture measurement device for measuring positions/postures of a plurality of articles positioned within a measurement region, wherein the position/posture measurement device is configured to send an output signal to a robot controller configured to control a robot to operate with respect to the plurality of articles, the position/posture measurement device comprising:
    a model data storing part configured to store feature information of each of the plurality of articles as model data;
    a position/posture calculating part configured to
        receive scene data including the plurality of articles from a sensor configured to capture the plurality of articles positioned within the measurement region, and
        calculate the positions/postures of the articles by comparing the model data with the scene data; and
    a combination evaluating part configured to
        select a plurality of combinations of the positions/postures of the plurality of articles positioned within the measurement region, which positions/postures are calculated by the position/posture calculating part,
        calculate evaluation values with respect to the respective selected combinations of the positions/postures, and
        output the combination of the positions/postures having the maximum evaluation value as a correct combination of the positions/postures of the articles to the robot controller for controlling the robot to operate with respect to the plurality of articles according to the correct combination of the positions/postures.

2. The position/posture measurement device as set forth in claim 1, wherein
    the combination evaluating part is configured to
        locate the model data on each position/posture of the articles,
        calculate (i) a degree of coincidence between the located model data and the scene data and (ii) a degree of overlapping, and
        calculate the evaluation value based on the degree of coincidence and the degree of overlapping, the degree of overlapping being obtained by calculating an overlapping region between the located model data when the model data is located on all pairs of positions/postures included in the combinations of the positions/postures.

3. The position/posture measurement device as set forth in claim 2, wherein
    the model data storing part is configured to store three-dimensional model data of the article as the feature information, and
    the combination evaluating part is configured to calculate the degree of overlapping as an overlapping volume between the located model data when the model data is located on all pairs of positions/postures included in the combinations of the positions/postures.

4. The position/posture measurement device as set forth in claim 2, wherein
    the model data storing part is configured to store three-dimensional model data of the article as the feature information,
    the sensor is configured to obtain three-dimensional features of surfaces of the articles within the measurement region as the scene data, and
    the combination evaluating part is configured to calculate, when the model data is located on each position/posture of the articles, the degree of coincidence
        as an area of a region where the surface of the three-dimensional model data coincides with the scene data, or
        as a number of three-dimensional points where the surface of the three-dimensional model data corresponds to the scene data.

5. The position/posture measurement device as set forth in claim 2, wherein
    the sensor is configured to obtain an image of the articles within the measurement region as the scene data, and
    the combination evaluating part is configured to calculates the degree of overlapping as an overlapping area between the located model data on the image when the model data is located on all pairs of positions/postures included in the combinations of the positions/postures.

6. The position/posture measurement device as set forth in claim 2, wherein
    the model data storing part is configured to store a group of feature points extracted from the feature information of the article, and
    the combination evaluating part is configured to
        extract a feature point from the scene data, and
        calculate the degree of coincidence as a number of the feature points included in the model data when the model data is located on the position/posture which coincides with the feature points extracted from the scene data.

7. The position/posture measurement device as set forth in claim 1, wherein
    the combination evaluating part is configured to select all combinations of the positions/postures calculated by the position/posture calculating part.

8. The position/posture measurement device as set forth in claim 1, wherein
    the combination evaluating part is configured to select only previously selected combinations of the positions/postures including a specific article, calculated by the position/posture calculating part.

9. The position/posture measurement device as set forth in claim 1, wherein
    the combination evaluating part is configured to select only previously selected combinations of the positions/ postures excluding a specific article, calculated by the position/posture calculating part.

10. The position/posture measurement device as set forth in claim 1, wherein
the combination evaluating part is configured to calculate the evaluation values of the selected combinations of the positions/postures, with respect to all pairs of positions/postures included in the combinations.

11. A robot system, comprising:
a position/posture measurement device configured to measure positions/postures of a plurality of articles positioned within a measurement region, the position/posture measurement device comprising:
   a model data storing part configured to store feature information of each of the plurality of articles as model data;
   a position/posture calculating part configured to
      receive scene data including the plurality of articles from a sensor configured to capture the plurality of articles positioned within the measurement region, and
      calculate the positions/postures of the articles by comparing the model data with the scene data; and
   a combination evaluating part configured to
      select a plurality of combinations of the positions/postures of the plurality of articles positioned within the measurement region, which positions/postures are calculated by the position/posture calculating part,
      calculate evaluation values with respect to the respective selected combinations of the positions/postures, and
      output the combination of the positions/postures having the maximum evaluation value as a correct combination of the positions/postures of the articles;
a robot configured to carry out an operation with respect to the plurality of articles; and
a robot controller configured to control the robot to operate with respect to the plurality of articles according to the correct combination of the positions/postures output by the position/posture measurement device.

* * * * *